H. F. KLEIN.
HAND TRUCK.
APPLICATION FILED MAY 15, 1920.
1,374,379. Patented Apr. 12, 1921.
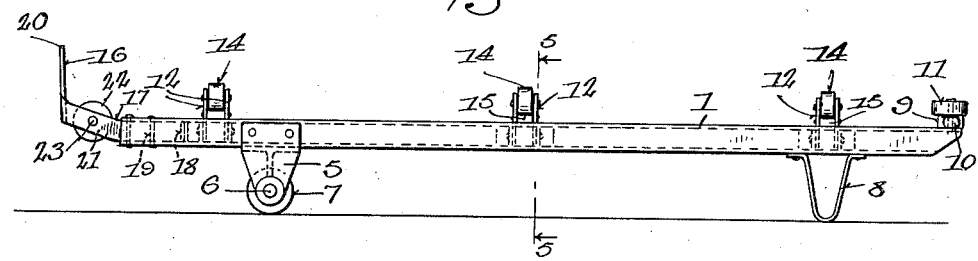
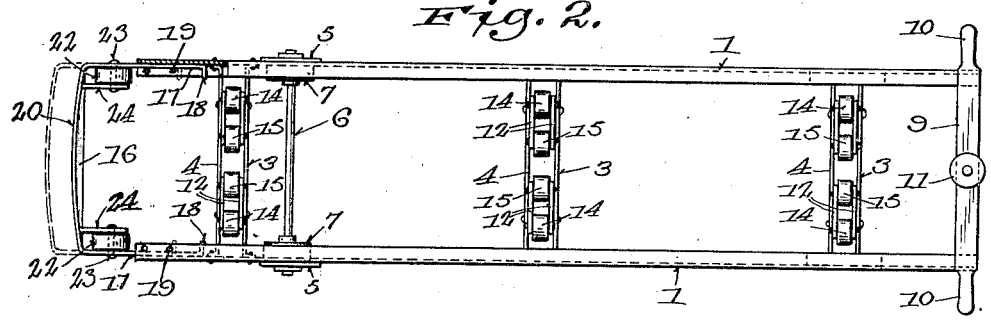
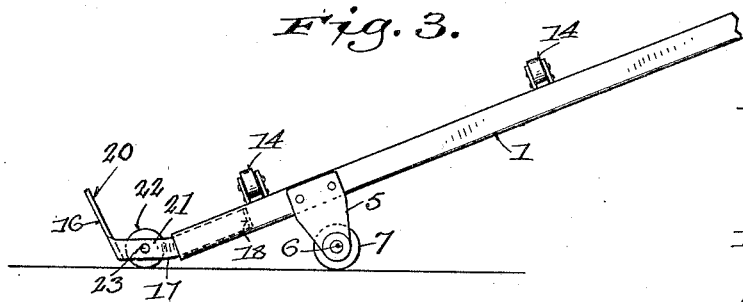
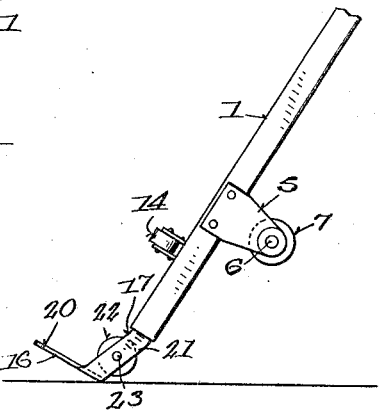
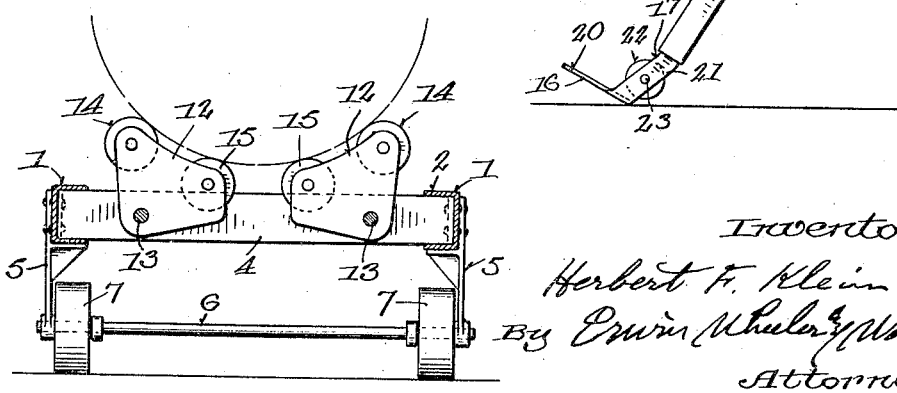
Inventor
Herbert F. Klein
By Erwin Wheeler & Woolard
Attorneys.

UNITED STATES PATENT OFFICE.

HERBERT F. KLEIN, OF DEERFIELD, WISCONSIN.

HAND-TRUCK.

1,374,379.   Specification of Letters Patent.   Patented Apr. 12, 1921.

Application filed May 15, 1920. Serial No. 381,603.

*To all whom it may concern:*

Be it known that I, HERBERT F. KLEIN, a citizen of the United States, residing at Deerfield, county of Dane, and State of Wisconsin, have invented new and useful Improvements in Hand-Trucks, of which the following is a specification.

This invention relates to hand trucks.

Objects of this invention are to provide a hand truck which will automatically adjust itself to the material mounted upon it; to provide a hand truck which will facilitate handling of material; to provide a hand truck upon which a roll of linoleum or other material may be either unrolled or rerolled without difficulty; to provide a hand truck which will prevent the creeping of the roll of material upwardly toward the handles, but will allow a slight extension thereof toward the lower portion of the truck; and to provide a hand truck by means of which the roll may easily be stood upon its end without danger of the truck's skidding while this is being accomplished.

In the drawings:

Figure 1 is a side elevation of the truck when it is resting upon the floor in horizontal position.

Fig. 2 is a plan view of the truck shown in the position in Fig. 1.

Fig. 3 illustrates the truck in raised position when it is being operated to transport the material.

Fig. 4 shows the truck as it is being tilted to a vertical position to stand the roll or other material on end.

Fig. 5 is a section on the line 5—5 of Fig. 1.

The hand truck comprises a pair of side bars 1, 1 which may conveniently be made of angle iron or channel iron as shown in Fig. 5 with the flanges 2 directed inwardly of the truck. These channel iron side bars are connected by cross bars 3 and 4 at suitable intervals, the bars 3 and 4 having flanges formed at their extreme ends and such flanges fitting between the flanges 2 of the side bar 1 and riveted to the intermediate web of the side bar 1. By this means a rigid structure is obtained. The side bars 1 have riveted thereto adjacent their lower portions, members 5 which carry the main truck axle 6 upon which are mounted the rollers 7. The upper portion of the truck is provided with rests 8 which are riveted upon the under side. The upper end of the truck is completed by a hand bar 9 which is secured to the side bars 1 and terminates in handles 10. Centrally mounted upon the hand bar 9 is a roller 11 whose purpose will later appear.

The cross braces 3 and 4 are positioned in pairs along the length of the truck, that is to say, there is a bottom pair, a central pair, and an end pair. Between the cross braces of each individual pair triangular members 12 are pivotally mounted at 13. These triangular members are also in pairs and carry between them a pair of rollers 14 and 15. Between each pair of cross bars, a pair of these groups of members is placed, that is to say, a right and left pair of triangular members 12 are pivotally mounted between each pair of cross bars. These members may rock upon the pivot 13 and may thereby adjust a curvature to which the four rollers 14 and 15 will conform so that no matter how the size of the roll may vary, it will always be properly supported by each one of the four rollers of each of the sets.

By this construction, it is possible to avoid the necessity of elaborately shaped or peculiarly shaped members, that is to say, arched, curved, or otherwise formed so as to conform to the roll, and in addition to this, greater range is secured by this adjustable manner.

The lower portion of the truck is completed by means of a U-shaped member 16 which has two parallel arms 17 extending between the flanges of the side members 1, 1 and sliding upon the inside of the rim of such side members. These arms 17 are provided with the inturned hook-shaped portion 18 which engages stops 19 to prevent the complete withdrawal of the U-shaped member 16 but still affording a limited motion thereof as indicated in dotted lines in Fig. 2. This U-shaped member 16 may be provided with an upwardly extending arch portion 20 to provide a suitable foot for the truck to prevent the load from sliding off of the truck, for instance, and to provide a suitably thin or flat member that may be readily slipped under a standing roll or withdrawn from a roll that is being stood on end. The side members 17 are formed of an angularly arranged section 21. This angular section 21 carries rollers 22, the bearings or axles 23 of such rollers being carried at one end by the angular sections 22 and at the other end by ears 24 formed from the material forming the extension 20, this extension 20 being an arch shaped piece, that is, secured to the cross portion of the U-shaped member 16.

While throughout the specification, the joining of the various parts has been specified as being formed by riveting, it is within the province of this invention to effect these unions by any suitable means, spot welding, brazing, bolting, or in any manner desired.

When a roll of linoleum, for instance, is placed upon the truck the rollers 14 and 15 adjust themselves about the pivot point 13 and exactly conform to the curvature of the roll. This roll of material may be manipulated, that is to say, unrolled or rolled up, while it is upon the truck as the rollers 14 and 15 readily permit such manipulation. If the roll becomes slightly crooked, for instance, or otherwise creeps, it may bear upon the roller 11 at the upper end of the truck and such roller will guide the upper end of the roll. This prevents creeping of the roll upwardly along the truck. When the roll extends, elongates, or creeps toward the lower end of the truck, the U-shaped member 16 together with the arch brace foot piece 20 move outwardly and provide a truck of slightly greater length to accommodate the increase in length of the roll.

By having the foot portion extensibly mounted with reference to the body portion, it is apparent that when the truck is in a horizontal position as indicated in Fig. 1 that the foot portion may be extended outwardly and thereby prevent binding against the outer or bottom end of the roll of linoleum or other material carried by such truck. In this condition, the linoleum may be unrolled as the weight of the roll is carried by the rollers 14 and free turning is permitted without removing the roll of linoleum from the truck. Also the roller 11 serves as a guide for the upper edge of the linoleum and prevents such roll from becoming displaced upon the truck. Therefore the extensible foot portion coöperates with the other portions of the truck, particularly the rollers, in preventing a braking action from being impressed upon the linoleum roll.

When the roll is being transported the truck may travel either upon the rollers 7 or else upon the rollers 7 and the rollers 22 as indicated in Fig. 3. This allows free and ready transportation of the roll. When it is desired to stand the roll on end, a slight increase of the angle of inclination causes the bottom or heeled portion of the member 16 to engage the floor as shown in Fig. 4, thereby lifting the rollers 22 and 7 out of engagement with the floor. This prevents the truck from skidding along the floor when it is attempted to stand the roll on end.

It will thus be seen that a hand truck has been provided which will allow ready and convenient manipulation of the material carried by such truck. It will also be seen that a truck of extremely simple and practical design has been constructed in which the parts used to form the truck may be of conventional shape and readily handled in assembling and in forming or making the parts.

I claim:

1. A hand truck comprising side bars, cross bars connecting said side bars, and rollers mounted upon said cross bars said rollers having motion of translation and rotation, whereby said rollers may occupy a plurality of positions with their axes constantly parallel.

2. A hand truck comprising side bars, cross bars joining said side bars, a plurality of members pivoted to said cross bars, and a pair of rollers carried by each of said members, whereby said members are adapted to pivot so as to place each roller of each pair tangent to any one of a plurality of circles.

3. A hand truck comprising a frame, rollers disposed with their axes longitudinally of said frame, and arranged to carry the load and an auxiliary roller positioned at one end of the frame and arranged with its axis at right angles to the longitudinal axis of the truck and arranged to guide the load.

4. A hand truck comprising side frame members, cross members joining said side frame members, a plurality of members pivotally joined to said cross frame members and each arranged to move about an axis substantially parallel to the longitudinal axis of said truck, and pairs of rollers carried by each of said pivotally mounted members, said rollers having their axes parallel to the pivotal axes of said members.

5. A hand truck comprising a body portion having wheels and a foot portion, said foot portion being arranged, under normal operating conditions, to slide telescopically with respect to said body portion, and auxiliary wheels carried by said foot portion.

6. A hand truck comprising a body, rollers mounted upon said body, said rollers being so arranged that their axes may occupy different parallel positions, whereby said rollers automatically conform to any curvature of load carried upon said truck.

In testimony whereof I affix my signature in the presence of two witnesses.

HERBERT F. KLEIN.

Witnesses:
H. B. FARGO,
V. C. JENSON.